July 16, 1946.  W. F. ALLER  2,403,897
LEAKAGE GAUGING DEVICE
Filed June 13, 1945
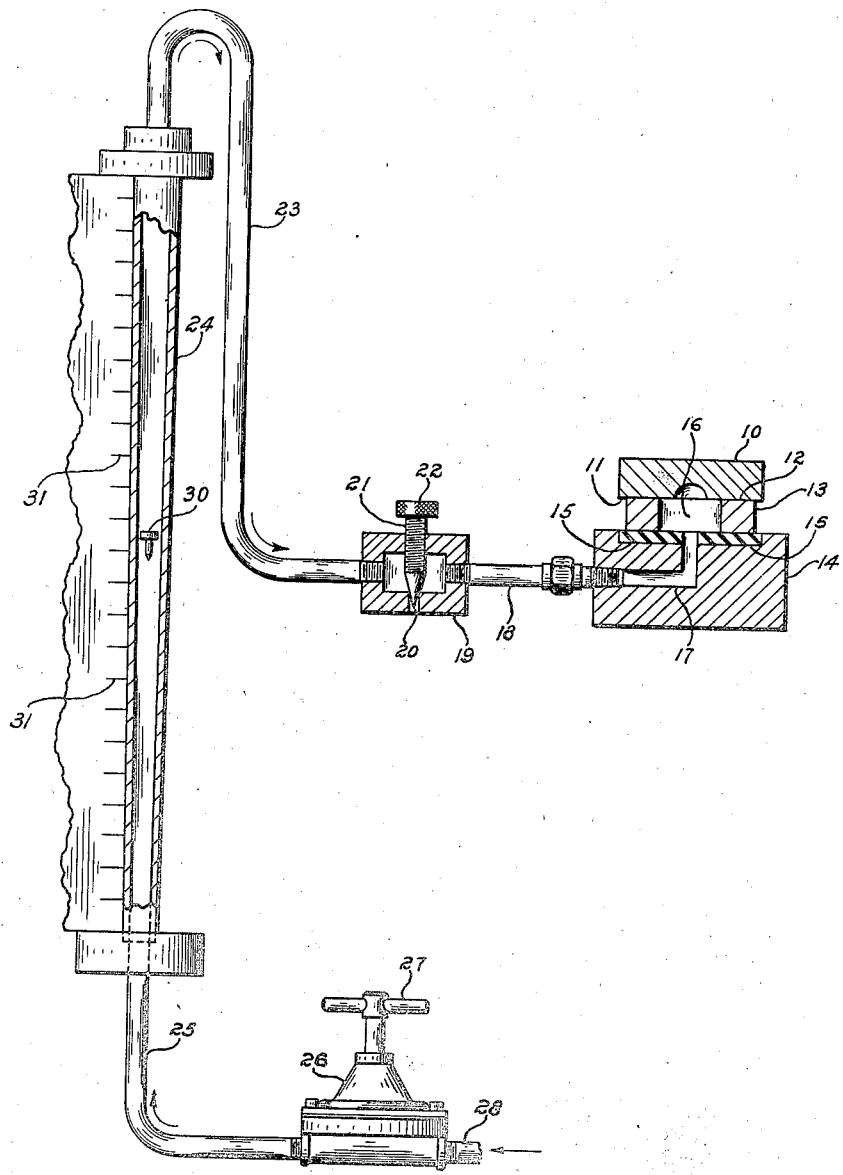
INVENTOR
W. F. Aller
BY
Edward T. Nosi Jr.
ATTORNEY Patented July 16, 1946

2,403,897

UNITED STATES PATENT OFFICE 2,403,897

LEAKAGE GAUGING DEVICE

Willis Fay Aller, Dayton, Ohio, assignor to The Sheffield Corporation, Dayton, Ohio, a corporation of Ohio Application June 13, 1945, Serial No. 599,202

3 Claims. (Cl. 73—40)

This invention relates to gauging devices, and more particularly to gauging devices for measuring a small leakage flow of air or other fluid at a part being checked.

One object of the invention is the provision of a gauging device having a flow measuring member that measures the rate of fluid flow from a supply source, the measuring member having a connection to a leakage orifice that provides sufficient leakage of the fluid to give a desired indication or reading on the measuring member, the outlet of the measuring member being also connected to a work connection member so that the rate of leakage at the part will be shown by the indication on the indicating member.

Another object is the provision of a gauging device for measuring fluid leakage and embodying a tube of tapering cross-sectional area with a float operable along the tube in accordance with the rate of flow of fluid through the tube, the outlet of the tube having a connection to a leakage orifice and a connection to a work connection member which is adapted for connection to a workpiece for checking leakage at the workpiece.

Another object is the provision of a gauge of the character mentioned, in which the leakage orifice that provides an indication of the rate of flow measuring device is readily adjustable so that the indication given, when there is no leakage flow through the part itself, is at a suitable point in the range of operation of the measuring device.

Other objects and advantages of the invention will be apparent from the following description, the appended claims, and the accompanying drawing.

In the drawing the figure shows a measuring or gauging device embodying the present invention.

Referring more particularly to the drawing, in which the various parts are identified by reference numerals, the invention is herein illustrated as a gauging device for measuring the leakage at or through a workpiece. The workpiece itself may take many forms. It may be a pump, for example, where it is desired to find how much leakage takes place past the pump impeller, and in such case the pump inlet or outlet is placed in communication with a chamber on the work connection member. It may be a part to be sized under low air pressure by a gauging nozzle on a work engaging member. The workpiece to be checked may have a flat surface or an irregular surface placed on or interfitting with another surface, where it is desired to check the amount of leakage that takes place between the fitting surfaces. Such a workpiece has been illustrated in the figure, as indicated at 10. As shown, the workpiece 10 has a lower surface 11 intended to interfit with the upper surface 12 of a piece 13 that may form a part of the workpiece or form an attachment used in conjunction with the work connection member 14.

The work connection member 14 preferably has an inserted rubber pad 15, so that the attachment 13 can merely rest on this pad with no leakage flow of fluid taking place between the lower side of the attachment 13 and the pad. The joint between the upper surface 12 of the attachment 13 and the lower side of the workpiece 10, if there is a perfect interfit, will not afford any leakage flow through this joint. However, if the surfaces do not interfit perfectly and there is a small leakage flow when air or other suitable fluid under pressure is supplied to the space 16 at the workpiece, the fluid supplied to that space will leak out through the crevices. In accordance with this invention, the presence of such a leakage and the rate of leakage flow is readily determined even though the amount of flow is exceedingly small.

The work connection member 14 has a chamber 17 that supplies fluid to the workpiece. A pipe 18 connects the work connection member to a valve 19 having an outlet orifice 20 leading to the atmosphere and having a valve member 21, such as an adjustable needle which can be turned by the thumb screw 22 to close the leakage orifice entirely or to open the leakage orifice to any desired extent. The valve 19 is supplied with air under pressure by a flexible tube 23 leading from the upper end of a vertical transparent tube 24 of substantial length, and of gradually increasing cross-sectional area in the inside of this tube, which has its smaller end at the bottom and its larger end at the top, as shown. The lower end of this tube is connected to a supply pipe 25 which leads from a pressure regulating valve 26 having an adjustable pressure regulating handle 27. Air under pressure is supplied to the valve through a supply connection 28 which extends to the factory air supply line or to any other suitable source of air pressure.

Within the tube 24 is a light measuring member or float 30, the diameter of which is very slightly less than the inside diameter of the lower end of the tube 24. When a flow of air takes place through the tube, the float is raised by the air flow until the space between the float and the walls of the tube is sufficient to hold the float stationary in an elevated position—for example, in the position shown in the figure. As the clearance between the float and the tube is small, and the weight of the float is small, a very small amount of air flow is sufficient to elevate the float in the tube.

In measuring the rate of leakage through a part or along a wall of a part to be checked, before the part is placed on the work connection member, air is supplied to the measuring tube 10 at a few pounds or a few ounces per square inch pressure depending upon the particular requirements of the part to be checked, and maintained at a constant value by the operation of the pressure regulating valve. The outlet of the chamber 17 is blocked off, as by covering that outlet with a flat workpiece or by holding the outlet hole closed by hand, and needle valve 21 is adjusted to provide sufficient leakage through the orifice 20 to the atmosphere to cause the float 30 to move up to some suitable position between the upper and lower ends of the tube 24. Its position along the tube is noted by observing the readings of the scale 31 alongside the tube. The workpiece is then placed in position on the work connection member and the position of the float 30 with respect to the scale 31 is then noted. If its position is the same as it was at the start of the operation, it will be clear that no leakage at all has taken place through or along the part being checked. If the float has moved upwardly to some new position, it shows the amount of leakage that takes place past the part. The scale can be calibrated so that the readings directly give the amount of leakage taking place through the part. In comparing a part to a master having a permissible amount of leakage, the master is first placed in position on the work connection member after having first adjusted the needle valve so that the flow through the orifice 20 alone raises the float to some suitable indicating position. With the master in place, the reading on the scale 31 is noted. The master is then removed and the work pieces to be checked are then successively applied to the work connection member, and after each piece is placed in position, the height of the float is noted to see if it falls even with, or below, the maximum permissible limits.

It will be apparent that if the leakage orifice 20 were not employed, there could be a very substantial amount of leakage taking place through or past the part on the work connection member without moving the float from its lower normal position in the tube. In accordance with the present invention, however, this objection is entirely overcome and an accurate and reliable reading is obtained even though the leakage flow through the part is exceedingly small.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A gauging device for measuring fluid leakage comprising a tube of tapering cross sectional area, means supporting said tube in substantially vertical position with the end of smaller area at the bottom, a pressure control means for supplying fluid under pressure to the lower end of the tube, a gravity actuated float operable along the tube by a flow of fluid through the tube, means providing a leakage orifice in communication with the upper end of the tube to provide a continuous leakage flow such as to cause elevation of the float, and a work connection member having a chamber communicating with the upper end of the tube and adapted for communication with a workpiece for testing leakage flow at the workpiece.

2. A gauging device for measuring fluid leakage comprising a tube of tapering cross sectional area, means supporting said tube in substantially vertical position with the end of smaller area at the bottom, a pressure control means for supplying fluid under constant pressure to the lower end of the tube, a gravity actuated float operable along the tube, means providing a controllable leakage orifice in communication with the upper end of the tube and having a readily adjustable means to vary the leakage through such orifice, means for adjusting the pressure of the fluid supplied to said tube, and a work connection member having a chamber in free communication with the upper end of said tube and adapted for connection to a workpiece for checking leakage at the workpiece.

3. A gauging device for measuring the rate of leakage of a part to be gauged comprising a tube of tapered cross sectional area, means supporting said tube in substantially vertical position with the end of smaller area at the bottom, an adjustable pressure regulating valve for supplying air under pressure to the lower end of the tube, a gravity actuated float operable along the tube, a leakage valve in communication with the upper end of the tube and having an adjustable valve member and a valve orifice leading to the atmosphere, a connection from the discharge side of said valve, and a work connection member in communication with said connection, said member having a yielding pad in which the workpiece can be applied and having a pressure chamber adapted for communication with the workpiece whereby the leakage along the workpiece will be indicated by said float.

WILLIS FAY ALLER.